UNITED STATES PATENT OFFICE.

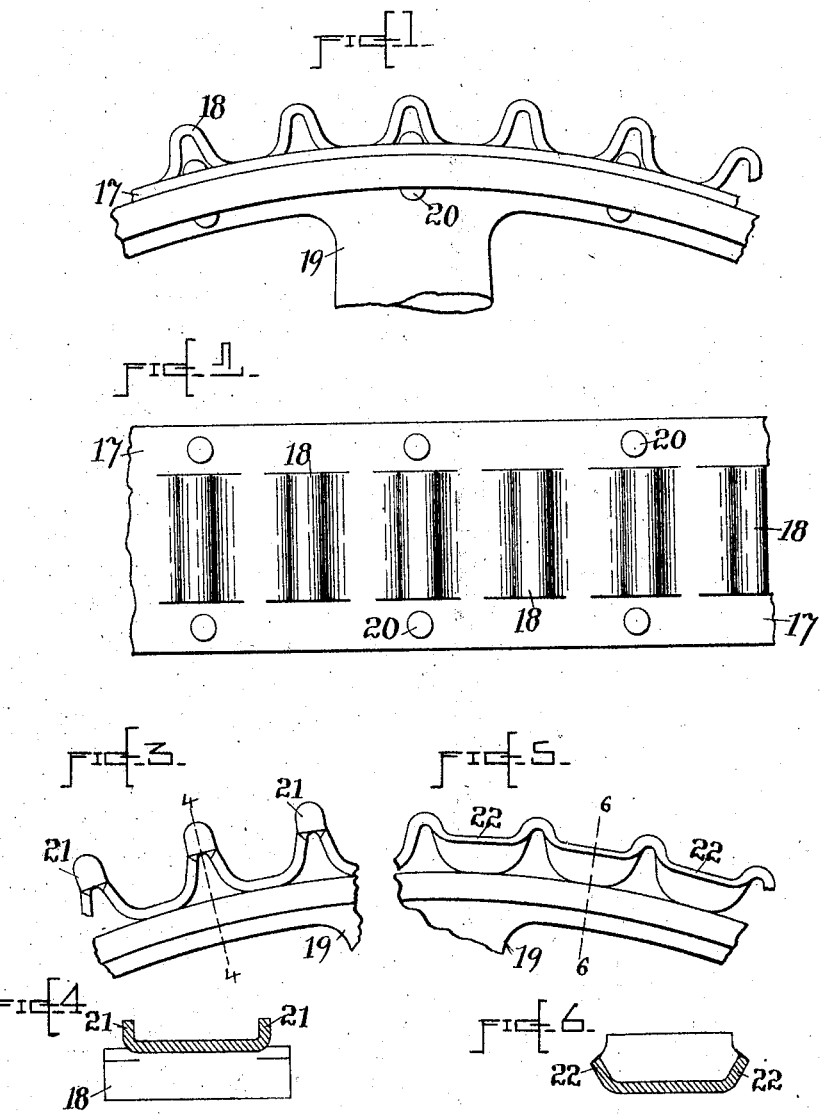

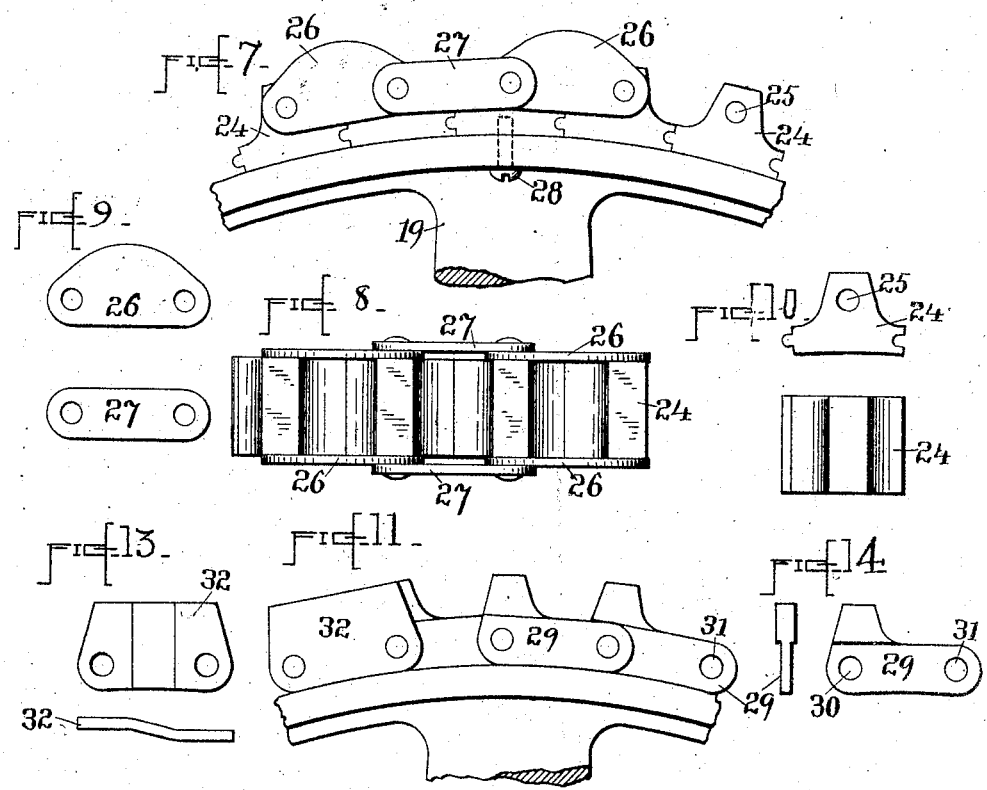

FRANK L. MORSE, OF TRUMANSBURG, NEW YORK, ASSIGNOR TO MORSE CHAIN COMPANY, OF TRUMANSBURG, NEW YORK.

DETACHABLE TEETH FOR GEAR-WHEELS.

No. 824,132.      Specification of Letters Patent.      Patented June 26, 1906.

Application filed April 2, 1901. Serial No. 54,018.

*To all whom it may concern:*

Be it known that I, FRANK L. MORSE, a citizen of the United States, and a resident of Trumansburg, in the county of Tompkins and State of New York, have invented a certain new and useful Improvement in Detachable Teeth for Gear-Wheels, of which the following is a specification.

This invention relates to detachable teeth for sprocket-wheels for chain gear-wheels, and especially to detachable sprocket-teeth for chain-gearing. Its principal object is the formation of gear-teeth in a manner such that the gear-wheels may be constructed at a less cost than heretofore and at the same time may be readily repaired by replacing worn teeth by new ones.

Another object is the provision of detachable gear-teeth, especially sprocket, that may be readily applied to wheels of various sizes.

With these objects in view the invention consists in the formation, construction, and combination hereinafter described and claimed, and while the invention is well adapted for general application it will be described with special reference to chain-gearing.

In the accompanying drawings, which form a part of this specification, Figure 1 shows in side elevation a portion of a sprocket-wheel involving my invention. Fig. 2 represents the same in plan view. Fig. 3 illustrates a modification in the series of sprocket-teeth. Fig. 4 is a vertical section through one of said teeth, taken on the line 4 4 of Fig. 3. Fig. 5 shows another modification in a series of sprocket-teeth. Fig. 6 is a transverse section through the strip or series of sprocket-teeth shown in Fig. 5, taken on the line 6 6. Fig. 7 shows in side elevation another formation of sprocket-teeth as mounted on a portion of a wheel or pulley. Fig. 8 shows in plan a portion of the series of teeth seen in Fig. 7. Figs. 9 and 10 illustrate details of the series of teeth seen in Figs. 7 and 8. Fig. 11 shows in side elevation a further modification in a series of sprocket or gear teeth. Fig. 12 shows in plan a portion of the teeth seen in Fig. 11. Figs. 13 and 14 show details of the teeth seen in Figs. 11 and 12.

In carrying out the invention above outlined a series of teeth are formed in any suitable way and said series attached by riveting or other means to the periphery of a wheel or pulley. In Figs. 1 to 6 a flexible strip of sprocket-teeth is shown, in which the teeth are struck up from sheet metal, which is then riveted to the periphery of the wheel or pulley that is to be equipped with teeth. As shown in Figs. 1 and 2, a strip of sheet metal, as 17, has had struck up therefrom along its middle line a series of projections 18, which shall serve as teeth when said strip is put in place. In Fig. 1 this strip is shown as mounted upon the periphery of a wheel, as 19, and secured thereto by means of rivets 20, in this manner forming either a gear or sprocket wheel. Obviously this strip might be located upon a straight bar and a toothed rack formed thereby. The plain strips left at the sides of the succession of teeth serve as a base-piece for securing the teeth in place, whether on a straight bar or on the periphery of a wheel. In Fig. 3 the teeth 18 have been provided with guides for a drive-chain by striking up portions of the metal from the ends of said teeth, as seen at 21. If preferrred, guides for the drive-chain may be formed at the ends of the valleys between the teeth, as shown at 22 in Figs. 5 and 6. In either of these forms just described the guides may be constructed at the time the teeth are formed.

Instead of making the removable gear or sprocket teeth from sheet metal with portions thereof struck up as just described, they may be made from parts or pieces united together substantially as shown in Figs. 7 to 14, the production of a flexible band of gear-teeth being effected in either way.

In Figs. 7 to 10 a flexible removable band of sprocket-teeth is shown as made up of blocks 24, on which the teeth are formed, dovetailed together at their bases and perforated longitudinally of the teeth, as at 25, for the reception of a pin or rivet, said blocks being held together in pairs by plates 26, and said pairs being held together by links 27. A band of teeth formed in this manner may be mounted upon a wheel or pulley 19, and the ends thereof joined by links 27, and the band of teeth thus constructed, prevented from creeping on said wheel or pulley by suitable stops or screws passed through the periphery of the pulley into the blocks 24, as indicated at 28, Fig. 7.

In Figs. 11 to 14 a flexible band of sprocket-teeth is shown, made from plates 29, stamped, swaged, or otherwise produced in the form illustrated, pin or rivet holes, as 30 31, being provided at the ends of the base for securing them together. When formed in this manner, the band of sprocket-teeth may be built up of any desired width. This series of sprocket-teeth in this last form may have secured to the sides thereof to serve as guides for the power-chain suitable plates, such as seen at 32, Fig. 13. Plates 26 and 27 in Fig. 7 also serve this same function for preventing the lateral displacement of the power-chain, plates 26 being extended beyond the teeth to provide an additional height for said guides.

Other modifications than those above specified may be made in the form and construction of removable sprocket-teeth without departing from the spirit of my invention.

I claim as my invention—

1. An article of manufacture comprising a flexible band of sprocket-teeth having lateral extensions on each side from the base of said teeth, said lateral extensions forming plain flat base pieces or flanges adapted to be bent around and secured to the periphery of a wheel.

2. An article of manufacture comprising a flat flexible metal strip having a line of hollow gear-teeth formed through the center thereof, and plain flat base pieces or flanges extending laterally from the base of said teeth.

3. An article of manufacture comprising a flexible band of sprocket-teeth provided with guide-pieces along the edges of the line of gear-teeth, whereby lateral movement of a drive-chain on said teeth is prevented.

4. An article of manufacture comprising a metal strip having a line of gear-teeth formed thereon, the teeth being provided at their ends with projecting guide-pieces for a power-chain.

5. The combination with a wheel or pulley, of a flexible metal strip having a line of gear-teeth formed thereon, base pieces or flanges extending laterally from the base of said teeth and detachably secured to the periphery of said wheel.

6. An article of manufacture comprising a flexible band of sprocket-teeth adapted to be placed around and secured to the periphery of a wheel, and guides along the sides of the line of teeth for preventing lateral displacement of a power-chain.

Signed at Trumansburg, in the county of Tompkins and State of New York, this 28th day of March, A. D. 1901.

FRANK L. MORSE.

Witnesses:
LEILA BANTA,
JULIA L. SEELYE.